(12) United States Patent
He et al.

(10) Patent No.: US 12,462,569 B2
(45) Date of Patent: Nov. 4, 2025

(54) IMAGE PROCESSING METHOD, ELECTRONIC DEVICE, AND COMPUTER PROGRAM PRODUCT

(71) Applicant: Dell Products L.P., Round Rock, TX (US)

(72) Inventors: Bin He, Shanghai (CN); Jiacheng Ni, Shanghai (CN); Wenlei Wu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 18/129,938

(22) Filed: Apr. 3, 2023

(65) Prior Publication Data

US 2024/0290104 A1 Aug. 29, 2024

(30) Foreign Application Priority Data

Feb. 27, 2023 (CN) .................. 202310207543.X

(51) Int. Cl.
G06V 10/778 (2022.01)
G06V 10/764 (2022.01)
(Continued)

(52) U.S. Cl.
CPC ............ G06V 20/54 (2022.01); G06V 10/764 (2022.01); G06V 10/778 (2022.01); G08G 1/16 (2013.01)

(58) Field of Classification Search
CPC ........ G06V 20/54; G06V 20/58; G06V 20/52; G06V 10/764; G06V 10/778; G06V 10/82;
(Continued)

(56) References Cited

U.S. PATENT DOCUMENTS

2019/0164049 A1* 5/2019 Bai ................ G08G 1/164
2020/0017117 A1* 1/2020 Milton ............. G08G 1/0112
(Continued)

OTHER PUBLICATIONS

Lin et al, Intelligent Traffic-Monitoring System Based on YOLO and Convolutional Fuzzy Neural Networks, IEEE Access Digital Object Identifier, (10) 2022; 14120-14133 (Year: 2022).*

(Continued)

*Primary Examiner* — Kathleen M Broughton
(74) *Attorney, Agent, or Firm* — Ryan, Mason & Lewis, LLP

(57) ABSTRACT

Embodiments of the present disclosure provide an image processing method, an electronic device, and a computer program product. The method may include receiving a sub-image containing a target object and location information of the target object from a first computing node, the sub-image being intercepted from a monitoring image by the first computing node through target detection, the monitoring image being acquired by a roadside device and containing the target object, and the first computing node being located near the roadside device. The method may further include determining classification information of the target object based on the sub-image at a second computing node different from the first computing node. In addition, the method may further include generating safety hint information for the target object at the second computing node at least based on the classification information and the location information.

20 Claims, 5 Drawing Sheets

(51) Int. Cl.
*G06V 20/54* (2022.01)
*G08G 1/16* (2006.01)

(58) Field of Classification Search
CPC ...... G06V 10/774; G08G 1/16; G06T 7/0002; G06T 7/70
See application file for complete search history.

(56) References Cited

U.S. PATENT DOCUMENTS

| | | | |
|---|---|---|---|
| 2022/0222921 A1* | 7/2022 | Xia | G06N 3/045 |
| 2022/0405952 A1* | 12/2022 | Niesen | G06T 7/70 |
| 2023/0030987 A1* | 2/2023 | Townsend | G06V 20/52 |
| 2023/0148351 A1* | 5/2023 | Kadar | G08G 1/0116 |
| | | | 348/149 |
| 2024/0086709 A1* | 3/2024 | Donderici | G06N 3/048 |
| 2024/0140459 A1* | 5/2024 | Ropel | G08G 1/165 |
| 2024/0290071 A1* | 8/2024 | Liu | G06V 10/761 |

OTHER PUBLICATIONS

Rao et al., A Deep Learning Approach Towards Building Intelligent Transport System, 2022, Second International Conference on Computer Science, Engineering and Applications, pp. 1-7. (Year: 2022).*
J. Huang et al., "An Efficient Optical Flow Based Motion Detection Method for Non-stationary Scenes," arXiv:1811.08290v2, Nov. 21, 2018, 6 pages.

* cited by examiner

IMAGE PROCESSING METHOD, ELECTRONIC DEVICE, AND COMPUTER PROGRAM PRODUCT

RELATED APPLICATION

The present application claims priority to Chinese Patent Application No. 202310207543.X, filed Feb. 27, 2023, and entitled "Image Processing Method, Electronic Device, and Computer Program Product," which is incorporated by reference herein in its entirety.

FIELD

Embodiments of the present disclosure relate to the field of computers, and more particularly, to an image processing method, an electronic device, and a computer program product.

BACKGROUND

In a vehicle network or other image processing fields, an image acquired by a monitoring device may be processed using artificial intelligence technologies such as machine learning or deep learning, so as to realize the identification of a monitored object in the image. Especially in the field of vehicle networks, a camera, a radar, and other monitoring devices, each illustratively a roadside device, may collect road images in real time and upload these images to a computing device with computing power. By processing these images, the computing device may determine a category, a location, and other information of a target object in the images, and then provide information such as navigation and safety hint for nearby vehicles. Because this kind of information has the demand of low delay, the computing device is usually arranged near a roadside device. Although deploying the computing device close to a roadside device brings benefits such as low latency and high bandwidth, deploying all computing power on a far edge side will significantly increase the cost.

SUMMARY

Embodiments of the present disclosure provide an image processing solution.

In a first aspect of the present disclosure, an image processing method is provided. The method may include receiving a sub-image containing a target object and location information of the target object from a first computing node, the sub-image being intercepted from a monitoring image by the first computing node through target detection, the monitoring image being acquired by a roadside device and containing the target object, and the first computing node being located near the roadside device. The method may further include determining classification information of the target object based on the sub-image at a second computing node different from the first computing node. In addition, the method may further include generating safety hint information for the target object at the second computing node at least based on the classification information and the location information.

In a second aspect of the present disclosure, an electronic device is provided, including: a processor; and a memory, coupled to the processor and having instructions stored therein, wherein the instructions, when executed by the processor, cause the electronic device to perform actions including: receiving a sub-image containing a target object and location information of the target object from a first computing node, the sub-image being intercepted from a monitoring image by the first computing node through target detection, the monitoring image being acquired by a roadside device and containing the target object, and the first computing node being located near the roadside device; determining classification information of the target object based on the sub-image at a second computing node different from the first computing node, the electronic device being located at the second computing node; and generating safety hint information for the target object at the second computing node at least based on the classification information and the location information.

In a third aspect of the present disclosure, a computer program product is provided. The computer program product is tangibly stored on a non-transitory computer-readable medium and includes machine-executable instructions. The machine-executable instructions, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, through which the above and other objectives, features, and advantages of the present disclosure will become more apparent, wherein identical or similar reference numbers generally represent identical or similar components in the example embodiments of the present disclosure. In the accompanying drawings.

DETAILED DESCRIPTION

Figure 1:
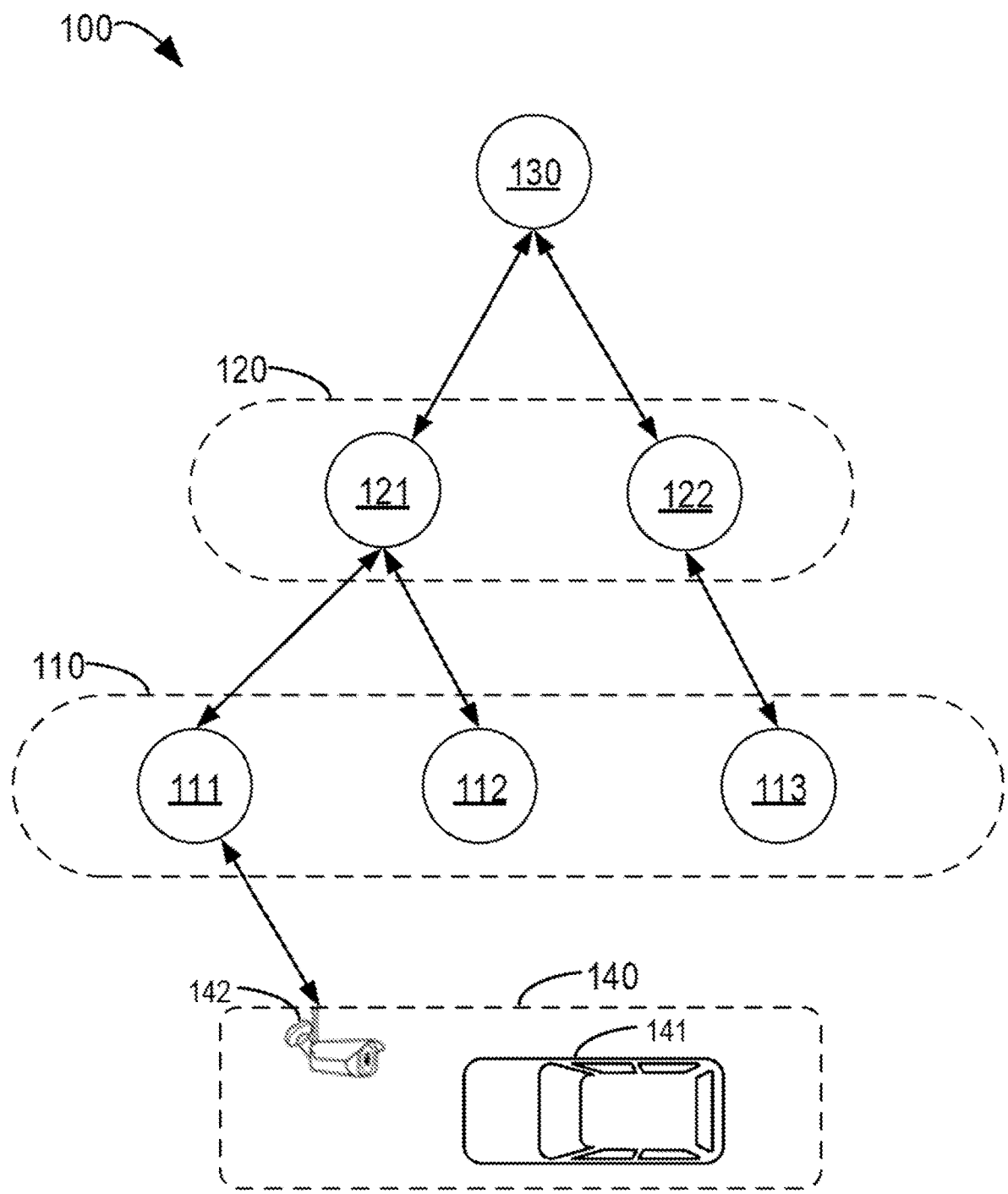
FIG. 1 illustrates a schematic diagram of an example environment of a multi-layer architecture according to an embodiment of the present disclosure.

Principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of example embodiments." The term "another embodiment" indicates "a group of other embodiments." The terms "first," "second," and the like may refer to different or identical objects. Other explicit and implicit definitions may also be included below.

As discussed above, in a traditional image processing process based on the Internet of Vehicles, a monitoring image acquired by a roadside device is usually uploaded to an edge computing node or a cloud. The edge computing node or the cloud deploys trained models for performing various functions, such as an image identification model, a path planning model, and a security alarm model. Therefore, in order to process the monitoring image with low delay and generate response data, the edge computing node or the cloud is usually arranged close to a roadside device. With extensive arrangement of the roadside devices, the demand for more edge computing nodes increases significantly. On the other hand, because the model run by the edge computing node or the cloud requires consumption of considerable computing resources and short computing time, the performance of the edge computing node is required to be high. Accordingly, the large number of edge computing nodes with high-level computing power significantly increases the overall operating cost of the Internet of Vehicles.

In addition, because each specific location may have characteristics that are different from other locations, the deployed model may not adapt to the data uploaded by the roadside device at each location, thus weakening the effectiveness of the model at each specific location, so the model for a specific location needs to be retrained using the data at that location. Moreover, categories of monitored target objects can be very broad. For example, a motor vehicle may include a car, a truck, a motorcycle, an electric motorcycle, etc. Among them, the motorcycle and the electric motorcycle may further include a category of delivery or express vehicles. Also, existing categories may be changed and new categories may be added, which require retraining of the model. However, retraining means greater demand for the computing resources.

In order to address, at least in part, the above disadvantages, a novel image processing solution is provided in embodiments of the present disclosure. In this solution, a computing device used for image processing is divided into a multi-layer architecture, illustratively a three-layer architecture. In the three-layer architecture, a first computing node in a first layer may be arranged near a roadside device to detect whether a monitoring image acquired by the roadside device contains a target object, such as a vehicle or a pedestrian, in real time. When there is the target object in the monitoring image, the first computing node may intercept a sub-image containing the target object from the monitoring image and upload the sub-image to a second layer in the three-layer architecture. A second computing node in the second layer may identify the received sub-image, so as to determine classification information of the target object, and then determine whether the target object may have the risk of traffic accident. It should be understood that an object detection model deployed at the first computing node in the first layer and the image identification model deployed at the second computing node in the second layer are both trained in a third layer of the three-layer architecture. Since the first computing node is located near the roadside device and the screened sub-image significantly reduces the amount of data, a bandwidth of data transmission and a processing speed of image identification at the second computing node may be significantly saved, thus ensuring a low delay of the system. In addition, when the model needs to be retrained due to a specific environmental problem or a new category problem of the target object, only the image identification model in the second computing node may be trained and updated, thus significantly improving operation efficiency. Because the three-tier architecture significantly reduces the demand for a computing device with high computing power, the operation cost of the system is reduced.

FIG. 1 shows a schematic diagram of example environment 100 according to an embodiment of the present disclosure. In example environment 100, a device and/or a process according to embodiments of the present disclosure may be implemented. As shown in FIG. 1, example environment 100 may include first layer 110, second layer 120, and third layer 130 in the three-layer architecture. In addition, example environment 100 further includes roadway real environment 140.

In FIG. 1, first layer 110 contains first computing node 111 and other computing nodes 112 and 113, second layer 120 contains second computing node 121 and other computing nodes 122, third layer 130 contains a cloud computing node, and roadway real environment 140 may contain target object 141 and roadside device 142. Specifically, first computing node 111 is configured to receive a monitoring image from roadside device 142 and monitor the received monitoring image. When target object 141 appears in one frame of monitoring image, first computing node 111 intercepts a sub-image containing target object 141 from the frame of monitoring image, and uploads the sub-image to second computing node 121. Second computing node 121 is usually arranged near a base station and is configured to determine classification information of target object 141 based on the sub-image. Furthermore, second computing node 121 may further determine whether target object 141 will have a traffic accident based on the classification information and location information of target object 141 in each frame of monitoring image.

It should be understood that computing nodes 112 and 113 located at first layer 110 may also receive monitoring images uploaded by other roadside devices (not shown). Alternatively or additionally, when first computing node 111 has insufficient computing power or fails, one of computing nodes 112 and 113 that is closer to roadside device 142 may receive the monitoring image uploaded by roadside device 142. As shown in FIG. 1, computing node 112 may transmit data to second computing node 121 belonging to the same cell or base station, and computing node 113 may transmit data to other computing nodes 122 located in second layer 120.

Finally, the cloud computing node located in third layer 130 may communicate with each computing node in second layer 120. It should be understood that a communication relationship between the computing nodes of all layers shown in FIG. 1 is exemplary. Each computing node in first layer 110 may directly communicate with the cloud computing node in third layer 130. Thus, the cloud computing node may train the model based on training data. As an example, the cloud computing node in third layer 130 may train an image identification model and deploy the trained image identification model to a corresponding computing node in second layer 120. In addition, the cloud computing node in third layer 130 may further train an object detection model and deploy the trained object detection model to a corresponding computing node in first layer 110. In addition to model training, the cloud computing node in third layer 130 may further retrain the trained model based on updated training data. It should be understood that the cloud computing node in third layer 130 may further perform dataset indexing for a search task in a computing node in second layer 120. In addition, the cloud computing node may further perform existing functions of the Internet of Vehicles cloud, such as traffic management, content provision, and service provision.

As shown in FIG. 1, target object 141 may be a motor vehicle or a non-motor vehicle, a pedestrian, etc., and roadside device 142 may be a camera, radar, etc. Roadside device 142 may be configured to acquire traveling information of target object 141, and upload the acquired traveling information to adjacent first computing node 111 in real time. It should be understood that roadside device 142 may be arranged at a predetermined interval on a traffic road or track, so that the traveling information of each target object traveling on a road surface may be comprehensively obtained.

In some embodiments, the computing nodes located in first layer 110 and second layer 120 may be any device with computing power. As a non-limiting example, the computing device may be any type of fixed computing device, mobile computing device, or portable computing device, including but not limited to a desktop computer, a laptop computer, a notebook computer, a netbook computer, a tablet computer, and the like. In addition, all or part of the components of the cloud computing device located in third layer 130 may be distributed in a cloud.

In some embodiments, all work nodes and cloud computing devices may include memories for storing content data. These memories may be replaced or supplemented by various other types of devices with a storage function, including but not limited to a hard disk drive (HDD), a solid state drive (SSD), a removable disk, any other magnetic storage device and any other optical storage device, or any combination thereof.

Figure 2:
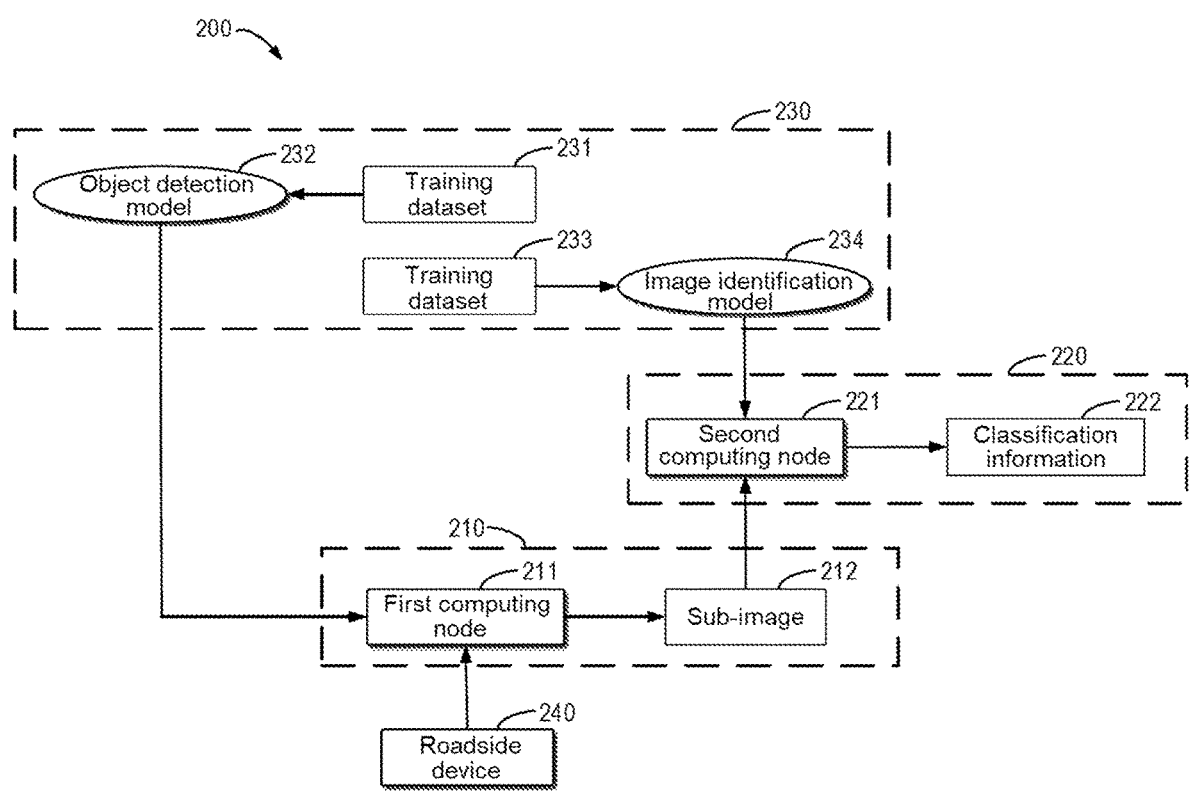
FIG. 2 illustrates a schematic diagram of an arrangement mode of a multi-layer architecture for image processing according to an embodiment of the present disclosure.

The following will describe a specific arrangement mode of the three-layer architecture above in detail with reference to FIG. 2. FIG. 2 illustrates a schematic diagram of an arrangement mode of three-layer architecture 200 for image processing according to an embodiment of the present disclosure. As shown in FIG. 2, three-layer architecture 200 contains first layer 210, second layer 220, and third layer 230. In addition, three-layer architecture 200 further includes roadside device 240.

In FIG. 2, three-layer architecture 200 may generally include a model training system arranged at third layer 230 and a model application system arranged at first layer 210 and second layer 220. As an example, the model training system may be implemented at the cloud computing node in third layer 130 as shown in FIG. 1, and the model application system may be implemented at first computing node 111 in first layer 110 and second computing node 121 in second layer 120 as shown in FIG. 1. It should be understood that the structure and functions of three-layer architecture 200 are described for illustrative purposes only, and are not intended to limit the scope of the subject matter described herein. The subject matter described herein may be implemented in different structures and/or functions.

As mentioned above, the process of processing field data using the model may be divided into two stages: a model training stage and a model application stage. As an example, in the model training stage, the model training system located in third layer 230 may use training dataset 231 to train object detection model 232 for performing the object detection function, and may use training dataset 233 to train image identification model 234 for performing the image identification function. It should be understood that training datasets 231 and 233 may be a combination of a plurality of pieces of sample data (as an input of the respective model) and corresponding labeled supervision information (also referred to as "label" or "truth value"). At the model application stage, the model application system may receive a trained model. For example, first computing node 211 may receive trained object detection model 232, and second computing node 221 may receive trained image identification model 234. Furthermore, first computing node 211 may use deployed object detection model 232 to intercept sub-image 212 containing the target object from the monitoring image from roadside device 240, and second computing node 221 may use deployed image identification model 234 to determine classification information 222 of the target object based on sub-image 212.

It should be understood that since object detection model 232 deployed by first computing node 211 only detects and tailors a specific object or region through computer vision or light machine learning tasks, it requires low computing power on the computing node and reduces a network bandwidth of data backhaul. In some embodiments, object detection model 232 may be a trained traditional model for determining a moving target object in a plurality of frames of monitoring images. Alternatively or additionally, the moving target object may be detected using a motion detection method based on optical flow. In addition, specific regions in the monitoring image, such as an intersection area, may also be clipped based on rules.

In addition, second computing node 221 performs classification, search, and other image processing tasks, or path planning tasks such as left turn assistance, right turn assistance, and intersection assistance by using pre-processed sub-image 212. In addition, second computing node 221 may further perform motion trajectory prediction of the target object to determine a possibility of a traffic accident between the target object and other target objects. Therefore, its computing power requirements may be configured to be greater than first computing node 211, but may be far smaller than the cloud computing device of third layer 230. Therefore, compared with deploying a large number of cloud computing devices, deploying second computing node 221 may save computing power and operation cost while providing ultra-low delay response for each decision.

Accordingly, the cloud computing device may usually be used to perform tasks that require high computing power and low delay, such as model training for an image identification task and an object detection task, and dataset indexing for a search task. The cloud computing device may further perform some statistical tasks by integrating information backhauled by all the edge computing nodes.

In other embodiments, object detection model 232 or image identification model 234 may be constructed as a learning network. In some embodiments, this learning network may include a plurality of networks, wherein each of the networks may be a multilayer neural network that may be constituted by a large number of neurons. Through the training process, corresponding parameters of the neurons in each of the networks can be determined. Parameters of the neurons in these networks are collectively referred to as parameters of the model.

The training process of object detection model 232 or image identification model 234 may be performed in an iterative manner until at least some of the parameters of the model converge or until a predetermined number of iterations is performed, thereby obtaining final model parameters.

It should be understood that FIG. 2 is intended only to illustrate some concepts of the present disclosure and is not intended to limit the scope of the present disclosure.

A process for data transmission according to an embodiment of the present disclosure will be described in detail below with reference to FIG. 3. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 3:
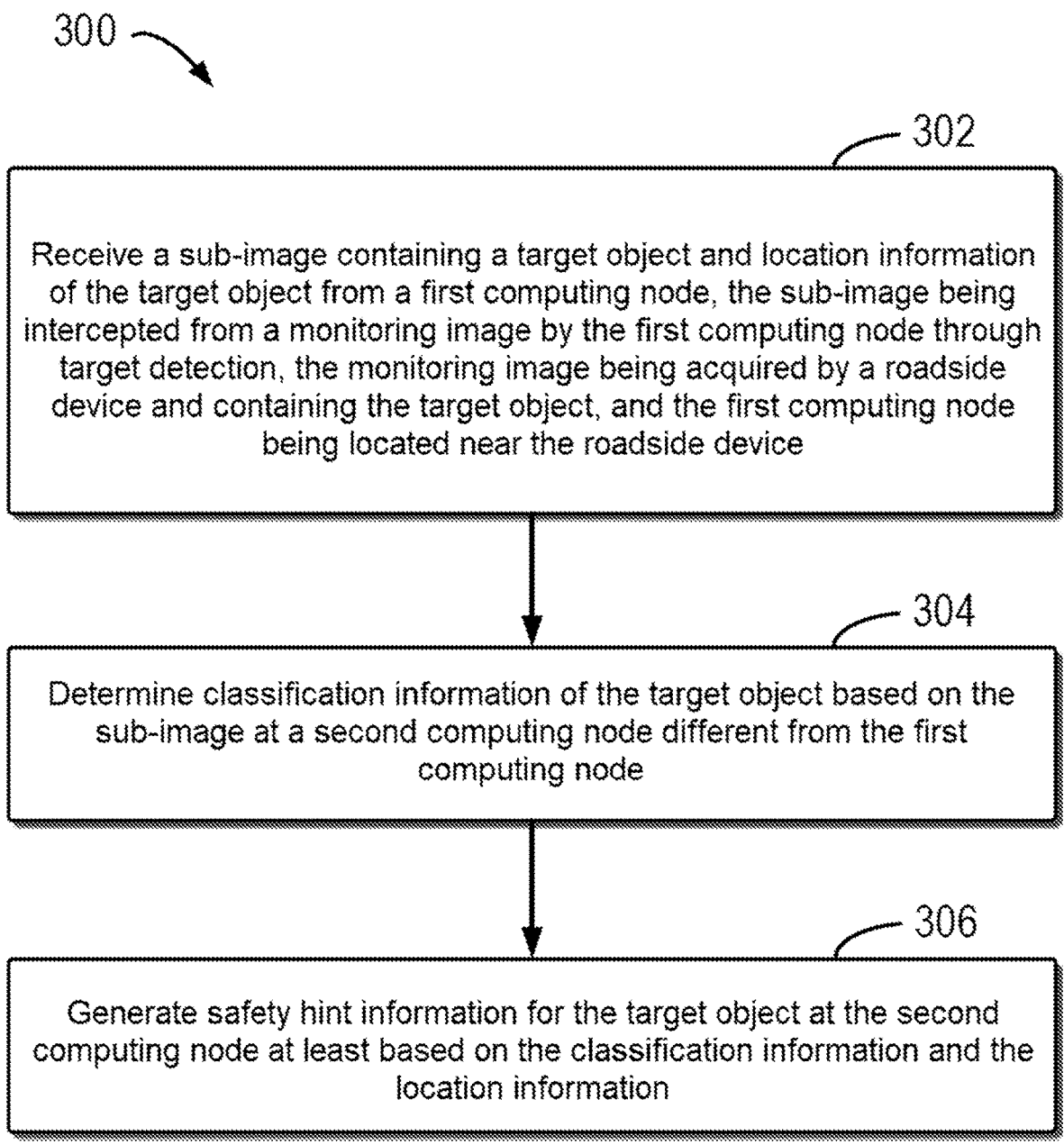
FIG. 3 illustrates a flow chart of a process for image processing according to an embodiment of the present disclosure.

FIG. 3 illustrates a flow chart of process 300 for image processing according to an embodiment of the present disclosure. In some embodiments, process 300 may be implemented at second computing node 121 in FIG. 1 or second computing node 221 in FIG. 2. Process 300 for image processing according to embodiments of the present disclosure is now described with reference to FIG. 3. For ease of understanding, specific examples mentioned in the following description are illustrative and are not intended to limit the protection scope of the present disclosure.

As shown in FIG. 3, at 302, second computing node 221 may receive sub-image 212 containing the target object and location information of the target object from first computing node 211. As mentioned above, sub-image 212 can be intercepted from the monitoring image by first computing node 211 through a target detection task. In some embodiments, the monitoring image may be acquired by roadside device 240 and contain the target object, and first computing node 211 is located near roadside device 240.

In some embodiments, sub-image 212 may be intercepted by object detection model 232 arranged at first computing node 211. Object detection model 232 is obtained by training at the cloud computing device located in third layer 230 by taking a reference monitoring image as input and a corresponding labeled image detection frame as output.

In some embodiments, the target object may include a motor vehicle, a non-motor vehicle, and/or a pedestrian, the motor vehicle may include an automobile and/or an electric motorcycle, and the non-motor vehicle may include a bicycle.

At 304, second computing node 221 may determine classification information 222 of the target object based on sub-image 212 at second computing node 221. In some embodiments, in order to determine classification information 222, second computing node 221 may apply sub-image 212 to image identification model 234 to determine classification information 222. Image identification model 234 is obtained by training at the cloud computing device located in third layer 230 by taking a reference image as input and corresponding labeled reference classification information as output.

In some embodiments, second computing node 221 may also perform a task of model fine tuning. As an example, second computing node 221 may retrain image identification model 234 by taking an additional reference image as input and corresponding labeled additional reference classification information as output. The additional reference image is acquired by roadside device 240. Through an operation of fine-tuning the model, image identification model 234 may better adapt to the specific environment near roadside device 240, thus making the output of image identification model 234 more accurate. It should be understood that the fine-tuned model may further be models of other functions running at second computing node 221, for example, navigation, safety hint, and other functions. Specifically, the model (for example, Resnet-50) may be retrained using distilled historical training data (containing manually corrected labeling information) plus new training data. For a search process with better scalability, it is easier to directly use new data to retrain the model and re-index the dataset.

In some embodiments, when second computing node 221 finds new classification information, image identification model 234 may be retrained at the cloud computing device in third layer 230 based on the new classification information. In other words, when a new classification occurs, only image identification model 234 needs to be retrained at the cloud computing device in third layer 230, and object detection model 232 may remain unchanged. In this way, the process of model retraining and model redeployment may be simplified.

In some embodiments, first computing node 211 and second computing node 221 are configured to process a user terminal request with a delay less than a threshold delay, and the cloud computing device in third layer 230 is configured to process a user terminal request with the delay greater than or equal to the threshold delay.

At 306, second computing node 221 may generate safety hint information for the target object at least based on classification information 222 and the location information. As an example, second computing node 221 may determine a probability of an accident of the target object at least based on classification information 222 and the location information, and when the probability is higher than a threshold probability, second computing node 221 may generate alarm information for the target object.

Figure 4:
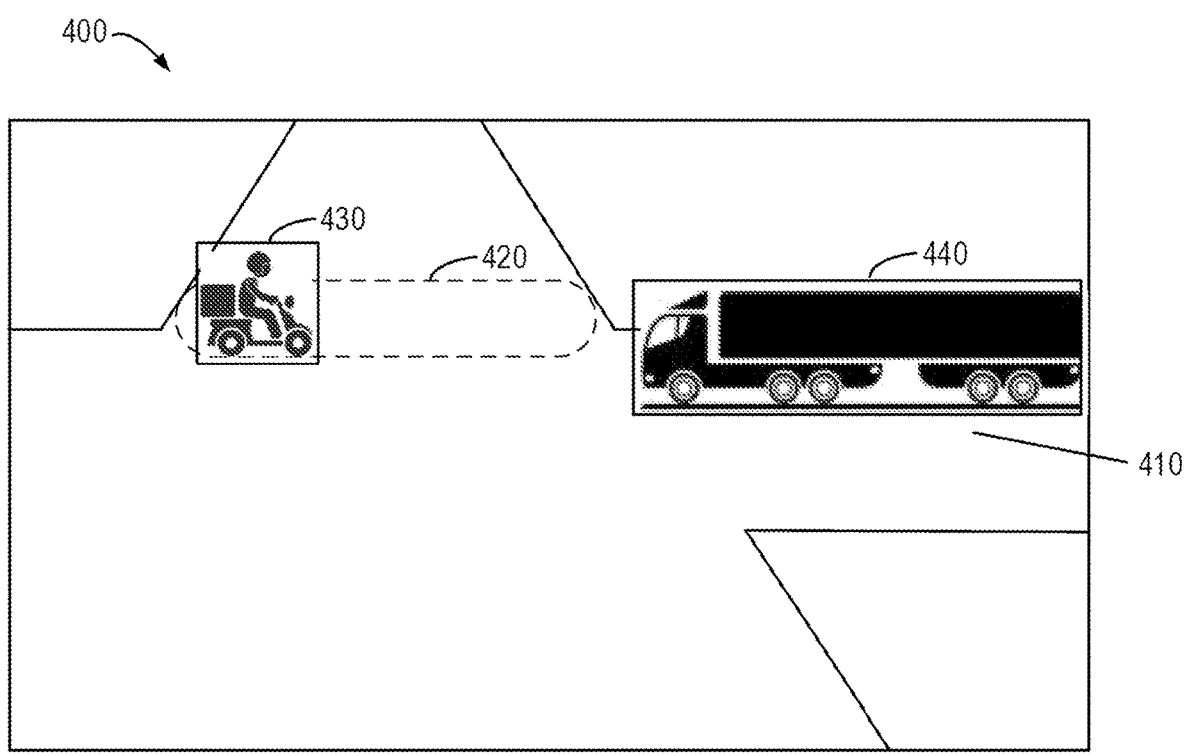
FIG. 4 illustrates a schematic diagram of a scenario of a possible traffic accident according to an embodiment of the present disclosure.

In order to further describe an application scenario of the image processing scheme of the present disclosure, an example of the application scenario is described with reference to FIG. 4. FIG. 4 illustrates a schematic diagram of a scenario of a possible traffic accident according to an embodiment of the present disclosure. As shown in FIG. 4, sub-image 400 shows a certain traffic intersection, containing a road 410, a pedestrian crossing 420, and two target objects 430 and 440. Target object 430 may be an electric motorcycle and its driver, and target object 440 may be a truck. It should be understood that target object 430 has the characteristics of fast speed and changeable vehicle routes, and target object 440 has the characteristics of large driving blind zone and difficult braking. Therefore, a motion trajectory of the two may be predicted through a plurality of frames of sub-images. Second computing node 221 may determine the possibility of the accident based on location information of the electric motorcycle and location information of the truck, and send alarm information to at least one of the driver of the electric motorcycle and a driver of the truck when the predicted probability is higher than the threshold probability. In this way, the traffic accident may be significantly reduced.

In some embodiments, the present disclosure provides a three-layer architecture: the cloud computing device located in the third layer is used to handle compute-intensive and low time-sensitive workloads, such as model training; the computing node located in the second layer is used to process tasks that require real-time response, thus reducing the delay and improving efficiency; and the computing node located in the first layer is used to extract useful information from the monitoring image to reduce network bandwidth consumption and provide real-time response when needed. In this way, a large classification model is decoupled into: the object detection model only for general category detection (dynamic and static) and the image identification model for specific classification of each category. The decoupled models are arranged at corresponding computing nodes according to the computing power requirements, thus achieving the balance and reasonable allocation of the workloads. In addition, another advantage of task decoupling is that when there are environmental changes such as the introduction of new types, only the image identification model needs to be updated without changing the object detection model.

Figure 5:
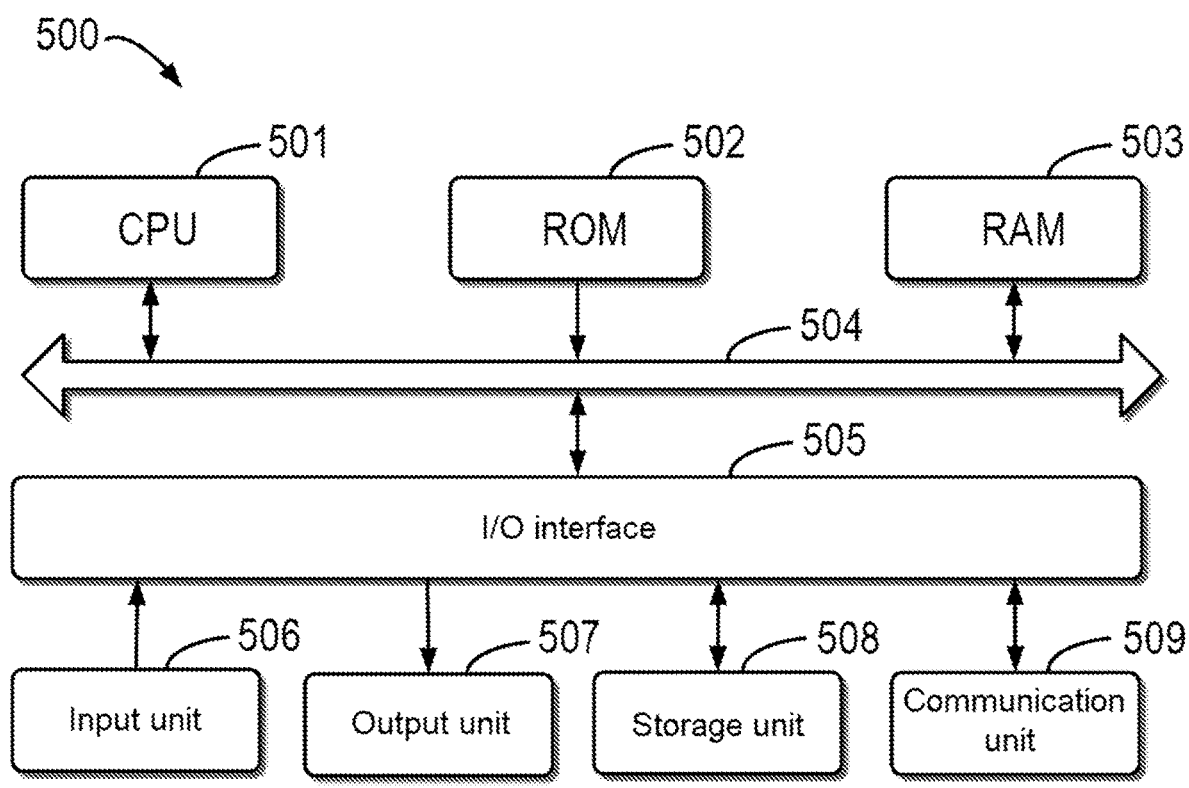
FIG. 5 illustrates a block diagram of an example device that can be used for implementing an embodiment of the present disclosure.

FIG. 5 illustrates a block diagram of example device 500 that may be used for implementing an embodiment of the present disclosure. For example, device 500 may be used for implementing a computing device as described herein. As shown in the figure, device 500 includes central processing unit (CPU) 501 that can execute various appropriate actions and processing according to computer program instructions stored in read-only memory (ROM) 502 or computer program instructions loaded from storage unit 508 into random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

CPU 501 executes the various methods and processing described above, such as process 300. For example, in some embodiments, the various methods and processing described above may be implemented as computer software programs or computer program products, which are tangibly included in a machine-readable medium, such as storage unit 508. In some embodiments, part of or all the computer programs may be loaded and/or installed to device 500 via ROM 502 and/or communication unit 509. When the computer programs are loaded into RAM 503 and executed by CPU 501, one or more steps of any process described above may be executed. Alternatively, in other embodiments, CPU 501 may be configured in any other suitable manners (for example, by means of firmware) to execute a process such as process 300.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may perform the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the accompanying drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations will be apparent to persons of ordinary skill in the art without departing from the scope and spirit of the illustrated embodiments. The selection of terms used herein is intended to best explain the principles and practical applications of the embodiments and their associated improvements, so as to enable persons of ordinary skill in the art to understand the embodiments disclosed herein.

What is claimed is:

1. An image processing method, comprising:
receiving a sub-image containing a target object and location information of the target object from a first computing node in a first layer of a multi-layer computing architecture, the sub-image being intercepted from a monitoring image by the first computing node through target detection, the monitoring image being acquired by a roadside device and containing the target object, and the first computing node being located near the roadside device, the target detection being performed using a first machine learning model deployed at the first computing node in the first layer of the multi-layer computing architecture and configured for object detection;
determining classification information of the target object based on the sub-image at a second computing node different from the first computing node, the second computing node being in a second layer of the multi-layer computing architecture, the determining of the classification information of the target object being performed using a second machine learning model, different than the first machine learning model, deployed at the second computing node in the second layer of the multi-layer computing architecture and configured for object classification; and
generating safety hint information for the target object at the second computing node at least based on the classification information and the location information;
wherein the first and second machine learning models are trained in at least one additional computing node in at least one additional layer of the multi-layer computing architecture.

2. The method according to claim 1, wherein determining the classification information comprises:
applying the sub-image to an image identification model to determine the classification information, the image identification model being obtained by training at a third computing node different from the first computing node and the second computing node by taking a reference image as input and corresponding labeled reference classification information as output.

3. The method according to claim 2, further comprising:
retraining the image identification model at the second computing node by taking an additional reference image as input and corresponding labeled additional reference classification information as output, the additional reference image being acquired by the roadside device.

4. The method according to claim 2, wherein the sub-image is intercepted by an object detection model arranged at the first computing node, and the object detection model is obtained by training at the third computing node by taking a reference monitoring image as input and a corresponding labeled image detection frame as output.

5. The method according to claim 4, further comprising:
retraining, in response to discovering that the classification information belongs to new classification information at the second computing node, the image identification model at the third computing node based on the new classification information.

6. The method according to claim 2, wherein the first computing node and the second computing node are configured to process a user terminal request with a delay less than a threshold delay, and the third computing node is configured to process a user terminal request with a delay greater than or equal to the threshold delay.

7. The method according to claim 1, wherein generating the safety hint information comprises:
determining a possibility of an accident of the target object at least based on the classification information and the location information; and
generating alarm information for the target object in response to the possibility being higher than a threshold possibility.

8. The method according to claim 1, wherein the target object comprises at least one of a motor vehicle, a non-motor vehicle, and a pedestrian, the motor vehicle comprises at least one of an automobile and an electric motorcycle, and the non-motor vehicle comprises a bicycle.

9. The method according to claim 8, wherein the monitoring image contains the target object and an additional target object, the target object comprises an electric motorcycle, the additional target object comprises a truck, and generating the safety hint information comprises:
    determining a possibility of an accident based on location information of the electric motorcycle and location information of the truck; and
    sending, in response to the possibility being higher than a threshold possibility, alarm information to at least one of the electric motorcycle and the truck.

10. An electronic device, comprising:
    at least one processor; and
    memory, coupled to the at least one processor and having instructions stored therein, wherein the instructions, when executed by the at least one processor, cause the electronic device to perform actions comprising:
        receiving a sub-image containing a target object and location information of the target object from a first computing node in a first layer of a multi-layer computing architecture, the sub-image being intercepted from a monitoring image by the first computing node through target detection, the monitoring image being acquired by a roadside device and containing the target object, and the first computing node being located near the roadside device, the target detection being performed using a first machine learning model deployed at the first computing node in the first layer of the multi-layer computing architecture and configured for object detection;
        determining classification information of the target object based on the sub-image at a second computing node different from the first computing node, the second computing node being in a second layer of the multi-layer computing architecture, the determining of the classification information of the target object being performed using a second machine learning model, different than the first machine learning model, deployed at the second computing node in the second layer of the multi-layer computing architecture and configured for object classification; and
        generating safety hint information for the target object at the second computing node at least based on the classification information and the location information;
        wherein the first and second machine learning models are trained in at least one additional computing node in at least one additional layer of the multi-layer computing architecture.

11. The electronic device according to claim 10, wherein determining the classification information comprises:
    applying the sub-image to an image identification model to determine the classification information, the image identification model being obtained by training at a third computing node different from the first computing node and the second computing node by taking a reference image as input and corresponding labeled reference classification information as output.

12. The electronic device according to claim 11, further comprising:
    retraining the image identification model at the second computing node by taking an additional reference image as input and corresponding labeled additional reference classification information as output, the additional reference image being acquired by the roadside device.

13. The electronic device according to claim 11, wherein the sub-image is intercepted by an object detection model arranged at the first computing node, and the object detection model is obtained by training at the third computing node by taking a reference monitoring image as input and a corresponding labeled image detection frame as output.

14. The electronic device according to claim 13, further comprising:
    retraining, in response to discovering that the classification information belongs to new classification information at the second computing node, the image identification model at the third computing node based on the new classification information.

15. The electronic device according to claim 11, wherein the first computing node and the second computing node are configured to process a user terminal request with a delay less than a threshold delay, and the third computing node is configured to process a user terminal request with a delay greater than or equal to the threshold delay.

16. The electronic device according to claim 10, wherein generating the safety hint information comprises:
    determining a possibility of an accident of the target object at least based on the classification information and the location information; and
    generating alarm information for the target object in response to the possibility being higher than a threshold possibility.

17. The electronic device according to claim 10, wherein the target object comprises at least one of a motor vehicle, a non-motor vehicle, and a pedestrian, the motor vehicle comprises at least one of an automobile and an electric motorcycle, and the non-motor vehicle comprises a bicycle.

18. The electronic device according to claim 17, wherein the monitoring image contains the target object and an additional target object, the target object comprises an electric motorcycle, the additional target object comprises a truck, and generating the safety hint information comprises:
    determining a possibility of an accident based on location information of the electric motorcycle and location information of the truck; and
    sending, in response to the possibility being higher than a threshold possibility, alarm information to at least one of the electric motorcycle and the truck.

19. A computer program product comprising a non-transitory computer-readable medium containing machine-executable instructions, wherein the machine-executable instructions, when executed by a machine, cause the machine to perform actions comprising:
    receiving a sub-image containing a target object and location information of the target object from a first computing node in a first layer of a multi-layer computing architecture, the sub-image being intercepted from a monitoring image by the first computing node through target detection, the monitoring image being acquired by a roadside device and containing the target object, and the first computing node being located near the roadside device, the target detection being performed using a first machine learning model deployed at the first computing node in the first layer of the multi-layer computing architecture and configured for object detection;
    determining classification information of the target object based on the sub-image at a second computing node different from the first computing node, the second computing node being in a second layer of the multi-layer computing architecture, the determining of the classification information of the target object being performed using a second machine learning model, different than the first machine learning model, deployed at the second computing node in the second layer of the multi-layer computing architecture and configured for object classification; and generating safety hint information for the target object at the second computing node at least based on the classification information and the location information;

wherein the first and second machine learning models are trained in at least one additional computing node in at least one additional layer of the multi-layer computing architecture.

20. The computer program product according to claim 19, wherein determining the classification information comprises:

applying the sub-image to an image identification model to determine the classification information, the image identification model being obtained by training at a third computing node different from the first computing node and the second computing node by taking a reference image as input and corresponding labeled reference classification information as output.

* * * * *